US009847803B2

(12) United States Patent
Brosnan

(10) Patent No.: US 9,847,803 B2
(45) Date of Patent: Dec. 19, 2017

(54) # ELECTROMAGNETIC INTERFERENCE REDUCTION BY BEAM STEERING USING PHASE VARIATION

(71) Applicant: Avago Technologies General IP (Singapore) Pte. Ltd., Singapore (SG)

(72) Inventor: Michael J. Brosnan, Fremont, CA (US)

(73) Assignee: AVAGO TECHNOLOGIES GENERAL IP (SINGAPORE) PTE. LTD. (SG)

( * ) Notice: Subject to any disclaimer, the term of this patent is extended or adjusted under 35 U.S.C. 154(b) by 0 days.

(21) Appl. No.: 14/883,345

(22) Filed: Oct. 14, 2015

(65) Prior Publication Data

US 2017/0111067 A1 Apr. 20, 2017

(51) Int. Cl.
*H04B 1/10* (2006.01)

(52) U.S. Cl.
CPC .................................... *H04B 1/10* (2013.01)

(58) Field of Classification Search
CPC ........................................................ H04B 1/10
See application file for complete search history.

(56) References Cited

U.S. PATENT DOCUMENTS

| | | | | |
|---|---|---|---|---|
| 5,103,232 A * | 4/1992 | Chang | H01Q 3/38 342/372 |
| 6,647,052 B2 | 11/2003 | Hailey | |
| 7,180,951 B2 | 2/2007 | Chan | |
| 9,031,181 B1 | 5/2015 | Roo | |
| 2006/0049984 A1* | 3/2006 | Easton | H01Q 3/2676 342/375 |
| 2015/0036726 A1* | 2/2015 | Pajona | H04B 7/043 375/219 |
| 2016/0226142 A1* | 8/2016 | Leroux | H01Q 3/28 342/372 |

* cited by examiner

*Primary Examiner* — Freshteh N Aghdam
(74) *Attorney, Agent, or Firm* — Sheridan Ross P.C.

(57) ABSTRACT

A system, method, and array of transceivers are disclosed. The disclosed method enables an efficient mechanism for managing electromagnetic radiation by a first processing device and a second processing device into a common area. Concepts of employing different time-varying phase delays at the different emitters of electromagnetic radiation help to minimize the otherwise cumulative effects of multiple emitters being located in close proximity to one another.

20 Claims, 7 Drawing Sheets

ELECTROMAGNETIC INTERFERENCE REDUCTION BY BEAM STEERING USING PHASE VARIATION

FIELD OF THE DISCLOSURE

The present disclosure is generally directed toward systems and devices that produce electromagnetic radiation and, in particular, ways to reduce constructive interference produced by multiple radiators.

BACKGROUND

High speed digital data network equipment must meet international requirements limiting radiated emissions to reduce interference with radio communications systems. For example, in the United States, above 960 MHz, the Federal Communication Commission (FCC) requires unintentional radiators to generate electric fields less than 300 uV/m at a distance of 10 m. As data rates increase, unintentional radiation tends to increase because higher edge rates and symbol rates radiate more efficiently on a given conductor geometry and the fields penetrate through holes in shields more efficiently. Power consumption of leading edge high speed data transceivers is fairly high and is usually cooled with the assistance of air flow, so openings in shielding enclosures are required even though they facilitate unintentional radiation, making it difficult to sufficiently shield emissions.

Furthermore, it is common to incorporate 32 or 48 or more transceiver modules per unit of digital switches and related network equipment. Each transceiver modules may include eight or more transmitters and receivers. Generally speaking, the transceiver modules are distributed along rack mounted equipment approximately 19 inches wide. This configuration represents a tightly-grouped array of (unintentional) radiators which spans many wavelengths.

BRIEF DESCRIPTION OF THE DRAWINGS

The present disclosure is described in conjunction with the appended figures, which are not necessarily drawn to scale.

DETAILED DESCRIPTION

Figure 1:
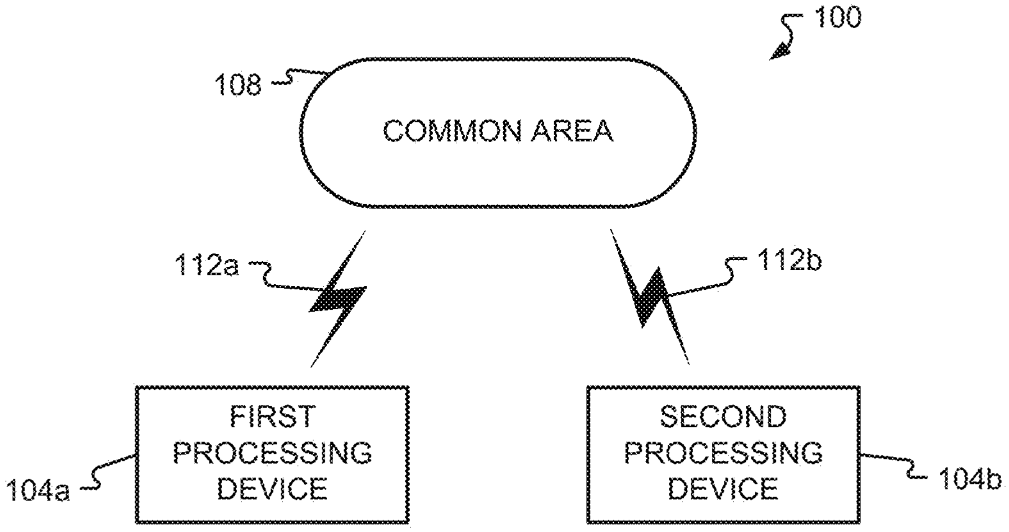
FIG. 1 is a block diagram depicting a first system of processing devices in accordance with at least some embodiments of the present disclosure.

Further discussing the issues associated with a tightly-grouped array of (unintentional) radiators, depending on the phase relationship between the emission sources and the azimuth angle to the observation antenna, the electric fields created by the source array can be as much as 48 times higher than the fields from one source (in the case of 48 tightly-grouped transceivers). It is quite difficult and time consuming to design fiber optic or wired transceivers at 25 Gbaud and faster which still complies with these international standards of radiation emission.

Embodiments of the present disclosure will be described in connection with any type of processing device or collection of processing devices that emit electromagnetic radiation as part of its operation. Processing devices that may particularly benefit from embodiments described herein include an array of transceivers operating at high data rates as discussed above. It should be appreciated, however, that embodiments of the present disclosure are not so limited.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims, it is one aspect of the present disclosure to provide a reduced cumulative effect of electromagnetic emission into a common area by a plurality of processing devices. In some embodiments, by employing the techniques described herein, a reduction in emission measurements can be realized on the order of 20*log 10(n) dB, where n is the number of processing devices driven at a fixed frequency. As a non-limiting example, an array of 48 processing device can experience an improvement of 16.8 dB for emissions into a common area that is within proximity of the 48 processing devices.

Adding time varying phase delays in each processing device within radiation range of a common area effectively steers the peak emission toward different time varying directions. This reduces the average amount of interference to radio communications equipment and reduces the reported field strengths when measuring compliance to requirements such as FCC Part 15. When an array of processing devices is spaced roughly 30 mm apart in a linear pattern (e.g., as where the processing devices are mounted in a server rack or the like) and when the emissions are primarily at (for example) 25.78125 GHz, the emission pattern vs. azimuth angle is a complex pattern of narrow lobes and deep nulls. By varying the phase of the data signals a few picoseconds, these emission lobes can be moved to different directions over time. If the phase variation frequency is on the order of 10 Hz to 100 Hz, such beam steering will happen rapidly enough to allow averaging over the time frame specified by international standards (e.g., 100 ms for FCC Part 15). Where the processing devices correspond to digital data transceiver modules, this proposed steering scheme will also be slow enough that clock recovery circuits on the receiving end of data links will not be affected (since typical clock recovery loop bandwidths are usually on the order of 10 MHz).

Embodiments of the present disclosure are cheaper to implement than solutions like improved shielding and the like and do not negatively impact link performance where the processing devices correspond to digital data transceiver modules.

Prior spread spectrum approaches such as clock frequency modulation can also reduce unintentional radiation measurements by spreading the energy over more than 1 MHz (the generally the required resolution bandwidth for measurements above 1 GHz), however these approaches are limited due to finite jitter tolerance of clock recovery circuits on the receiving end of data links. Use of different frequency clocks for each processing device can also reduce unintentional radiation measurements while embodiments of the present disclosure, on the other hand, can provide more reduction than the multiple clock frequency approach because data standards generally require +/−100 ppm frequency accuracy, limiting the amount of spreading to only a small multiple of the 1 MHz resolution bandwidth generally required by international standards. In some embodiments, the disclosed practices can be implemented with firmware changes only. Other solutions generally require hardware changes (electrical and/or mechanical), which are almost sure to be more expensive that firmware updates.

With reference now to FIG. 1, additional details of a system 100 will be described in accordance with at least some embodiments of the present disclosure. The system 100 is shown to include a first processing device 104*a* and a second processing device 104*b*. The first processing device 104*a* and second processing device 104*b* may correspond to the same types of devices or different types of devices. A common feature between the processing devices 104*a*, 104*b* is that both devices are capable of emitting radiation 112*a*, 112*b*, respectively. In embodiments where the processing devices 104*a*, 104*b* are co-located or otherwise positioned in close, transmission distance, proximity of one another, the processing devices 104*a*, 104*b* may both contribute to a total electromagnetic radiation for the common area 108.

The common area 108 may correspond to a two or three dimensional space within a predetermined distance of both the processing devices 104*a*, 104*b*. In some embodiments, the common area 108 corresponds to an area in which both the first processing device 104*a* and second processing device 104*b* emit a detectable amount of electromagnetic radiation 112*a*, 112*b*, respectively. As will be discussed in further detail herein, unless certain measures are taken to steer the peak emission direction of the sum of electromagnetic radiation contributions 112*a* and 112*b* away from the common area, there may be situations where the amount of total (maximum or average) electromagnetic radiation in the common area 108 exceeds a predetermined threshold (e.g., governmental threshold, standard-body threshold, best practice threshold, etc.).

As mentioned above, the processing devices 104*a*, 104*b* may be the same type or similar types of devices. As an example, both processing devices 104*a*, 104*b* may correspond to or include one or more digital data transceiver modules that are used in an optical/fiber optic communication system. Other examples of processing devices 104*a*, 104*b* include, without limitation, servers, server blades, server components (e.g., network cards, optical modules, Printed Circuit Boards (PCBs), optical receivers, optical transmitters, modems, gateways, switches, etc. Indeed, any type of computing device having a processor or microprocessor and one or more electrical traces that are capable of emitting electromagnetic radiation (by virtue of alternating current flow) may be referred to as a processing device.

Figure 2:
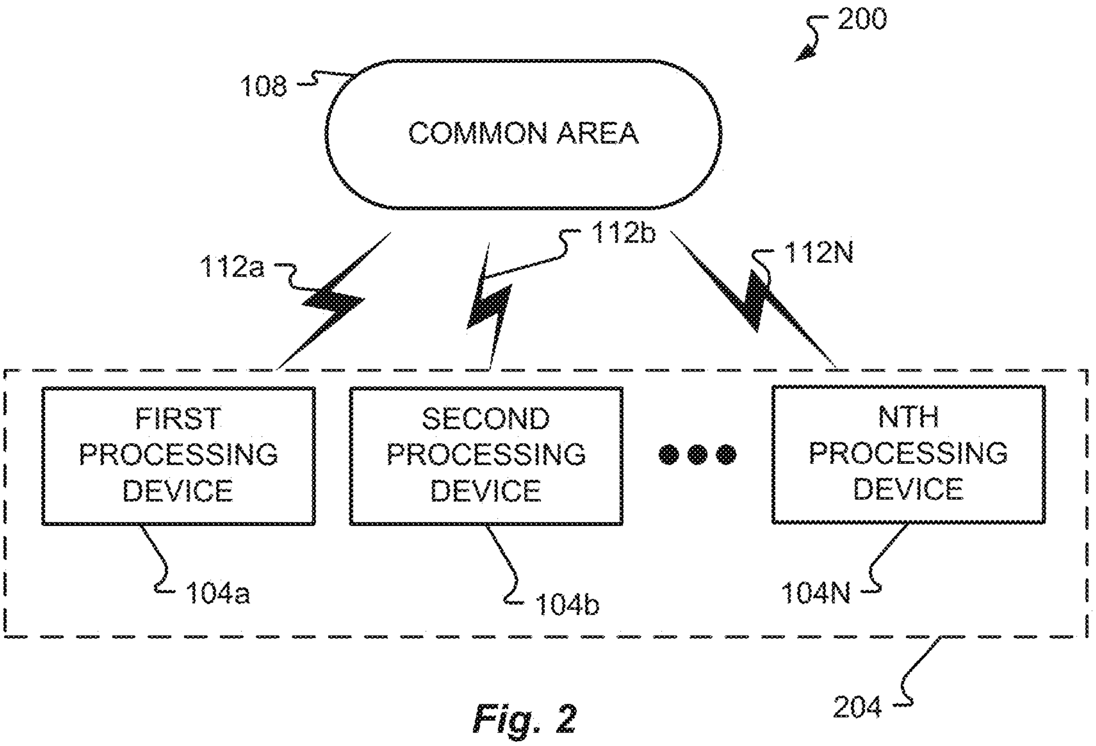
FIG. 2 is a block diagram depicting a second system of processing devices in accordance with at least some embodiments of the present disclosure.

With reference now to FIG. 2, another example of a system 200 having multiple processing devices 104*a*-N will be described in accordance with at least some embodiments of the present disclosure. The number, N, of processing devices included in the plurality of processing devices can be any integer number greater than or equal to two. The processing devices 104*a*, 104*b*, . . . , 104N may be the same or similar to one another or they may be different types of processing devices.

Again, each processing device 104*a*-N may contribute a certain amount of electromagnetic radiation 112*a*-N to the common area 108 by virtue of their operation. As can be appreciated, when the number of processing devices 104*a*-N within a small area becomes larger, then the total amount of electromagnetic radiation contributed to the common area 108 may increase. Furthermore, if the emissions 112 of two or more processing devices 104*a*-N happen to arrive in phase, then the total (peak and/or average) amount of electromagnetic radiation in the common area 108 will be greatly increased. This may result in the total electromagnetic radiation exceeding a predetermined threshold for the common area 108.

FIG. 2 also shows that the plurality of processing devices 104*a*-N may be contained in a common fixture or structure 204, which effectively defines the common area 108 and creates the problem of overlapping radiation into the common area 108 by the processing devices 104*a*-N. In some embodiments, the structure 204 corresponds to a server rack or set of racks that are contained within a common room of a building. Other examples of common structures 204 include, without limitation, shelves, hangers, tables, racks, vehicles, boxes, etc. Indeed, any type of mechanical structure that holds or supports two or more processing devices 104*a*-N may correspond to a structure 204 without departing from the scope of the present disclosure.

Figure 3:
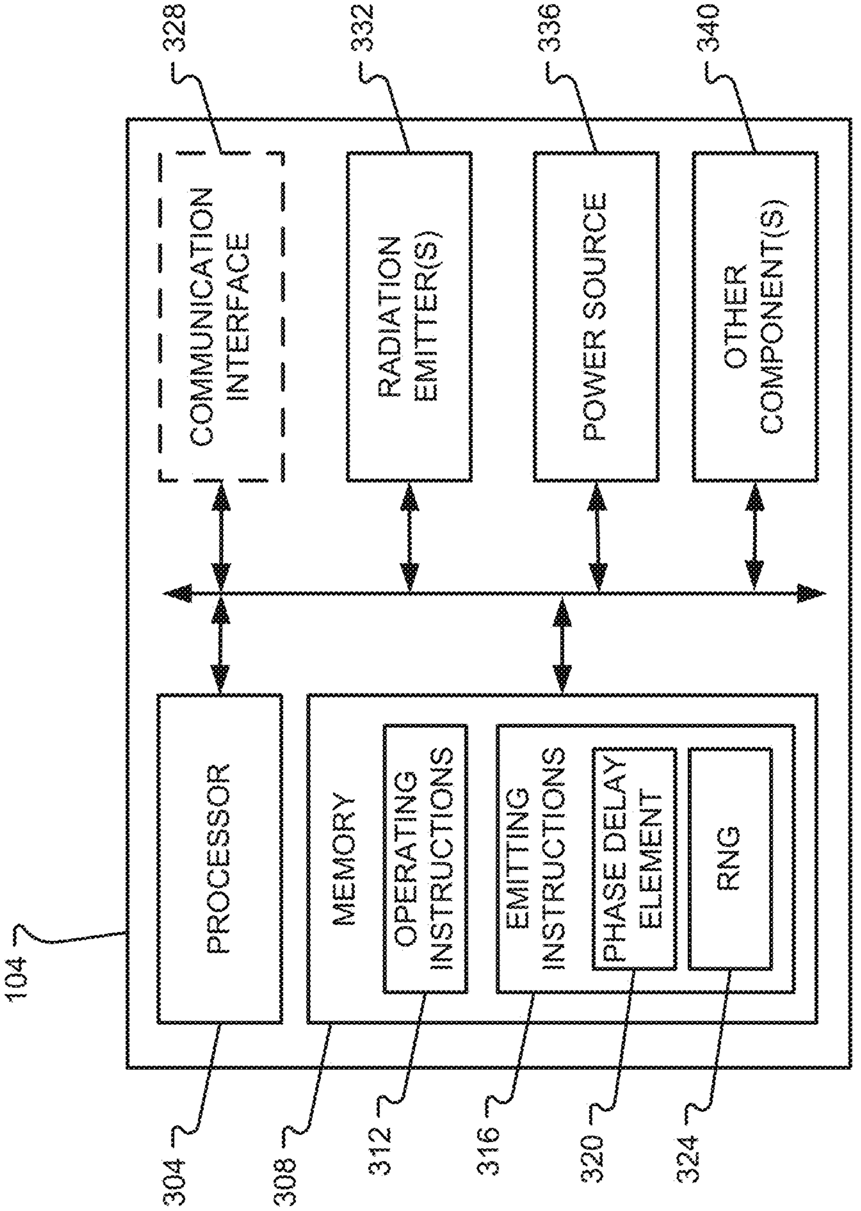
FIG. 3 is a block diagram depicting details of a processing device in accordance with at least some embodiments of the present disclosure.

With reference now to FIG. 3, additional details of a processing device 104 will be described in accordance with at least some embodiments of the present disclosure. The processing device 104 is shown to include a processor 304, memory 308, an optional communication interface 238, one or more radiation emitters 332, a power source 336, and other component(s) 340.

The processor 304 may include any type of known or yet-to-be developed processor or collection of processors used in computing devices. The processor 304 may include, without limitation, a microprocessor, a collection of microprocessors, an Integrated Circuit (IC) chip, a collection of IC chips, an Application Specific Integrated Circuit (ASIC), a Field Programmable Gate Array (FPGA), a digital processor, an analog processor, or any other collection of circuit elements configured to receive one or more input signals and generate one or more output signals. The processor 304, in some embodiments, may be configured to receive instructions from the memory 308 and execute the instructions in a parallel or serial-processing fashion.

The memory 308 may include any type of computer memory capable of storing data, instructions, collections of instructions, and the like. Suitable examples of memory 308 include, without limitation, ROM, RAM, flash memory (NOR or NAND flash memory), EEPROM, buffer memory, cache memory, variants thereof, combinations thereof, or any other type of computer memory that is known or yet-to-be developed.

The memory 308 is shown to contain instructions in the form of operating instructions 312 and emitting instructions 316. It should be appreciated that these instructions may be combined into a single instruction set or they may be separated into more than two instruction sets. The instructions may be stored as software, firmware, or any other format. The operating instructions 312, when executed by the processor 304, may cause the processing device 104 to perform its desired behaviors. For instance, where the processing device 104 corresponds to a digital data transceiver module that is used in an optical/fiber optic communication system, the operating instructions 312 may enable the processing device 104 to send and/or receive optical signals via the optical fiber of the communication system and transform such signals to/from electrical signals. The operating instructions 312 may also include one or more drivers for the various hardware components of the processing device 104.

The emitting instructions 316, when executed by the processor 304, may enable the processing device 104 to intelligently steer electromagnetic radiation 112. More specifically, the emitting instructions 316 may include a phase delay element 320 and a random number generator 324. The phase delay element 320 may cause the processing device 104 to implement a time-varying phase delay to steer a peak of the net electromagnetic radiation 112 in a particular time-varying direction. For instance, when two processing devices 104*a*, 104*b* are co-located with respect to a common area 108, a phase delay element 320 of the first processing device 104*a* may cause the first processing device 104*a* to implement a first time-varying phase delay whereas a phase delay element 320 of the second processing device 104*b* may cause the second processing device 104*b* to implement a second time-varying phase delay such that the direction for which the electric fields from electromagnetic radiation 112*a* and 112*b* arrive in phase is steered in a time-varying direction. In some embodiments, enabling the different processing devices 104*a*, 104*b* to steer their net electromagnetic radiation 112 in different directions facilitates a reduction in an average emission of electromagnetic radiation in the common area 108 by the first and second processing devices 104*a*, 104*b*. It should be appreciated that the first time-varying phase delay may be different from the second time-varying phase delay. In other embodiments, the first time-varying phase delay can be the same as the second time-varying phase delay but the first time-varying delay may be offset in time relative to the second time-varying phase delay. In other words, both processing devices 104*a*, 104*b* may implement the same time-varying delays, but at different (unsynchronized) times.

It may also be possible to utilize the random number generator 324 of the emitting instructions 316 to further ensure that the peak emissions of the processing devices 104*a*-N do not overlay in time. More specifically, the time-varying delay produced by the phase delay element 320 may be at least partially driven by the random number generator 324. This enables the various processing devices 104*a*-N near the common area 108 to execute their operating instructions 312 and/or emitting instructions 316 without requiring knowledge of the other processing devices 104*a*-N and the time-varying phase delays being implemented thereby. In other embodiments, there may be coordination between the processing devices 104*a*-N to ensure that their phase delays are not synchronized and, thus, ensure that the direction of net peak emissions varies with time. Such coordination may be facilitated by direct (e.g., processing device-to-processing device) communications or indirect communications. The indirect coordination may be facilitated by a phase-delay coordinator that is attached and in communication with the various processing devices 104*a*-N and is coordinating the various time-varying phase delays of the different processing devices 104*a*-N.

The processing device 104 is also shown to include an optional communication interface 328, which may correspond to any type of wired or wireless communication interface. Examples of communication interfaces 328 may include, without limitation, antennas, network cards, communication ports (e.g., Ethernet ports, optical fiber ports, etc.) and the like.

The radiation emitter(s) 332 of the processing device 104 may correspond to any element or collection of elements in the processing device 104 that produce electromagnetic radiation 112. In some embodiments, the radiation emitter(s) 332 may further correspond to those emitters that respond to the emitting instructions 316, rather than all emitters in the processing device 104. The radiation emitter(s) 332 may include the communication interface 328, the processor 304, the power source 336, other components 340, as well as the circuitry that constitutes these elements of the processing device 104.

The power source 336 may correspond to either an internal or external power source. The power source 336 may provide AC and/or DC power to the other components of the processing device 104. Examples of suitable power sources include batteries, power converters for conditioning AC power received from an outlet into usable DC power, transformers, etc. The power source 336 may be contained within a common housing with the other components of the processing device 104 or the power source 336 maybe located external to the housing.

The other components 340 may include any other type of known components used in a processing device 104. Examples of other components 340 include, without limitation, user interfaces (e.g., user input and/or output devices), drivers, peripheral devices, filters, amplifiers, and the like.

Figure 4:
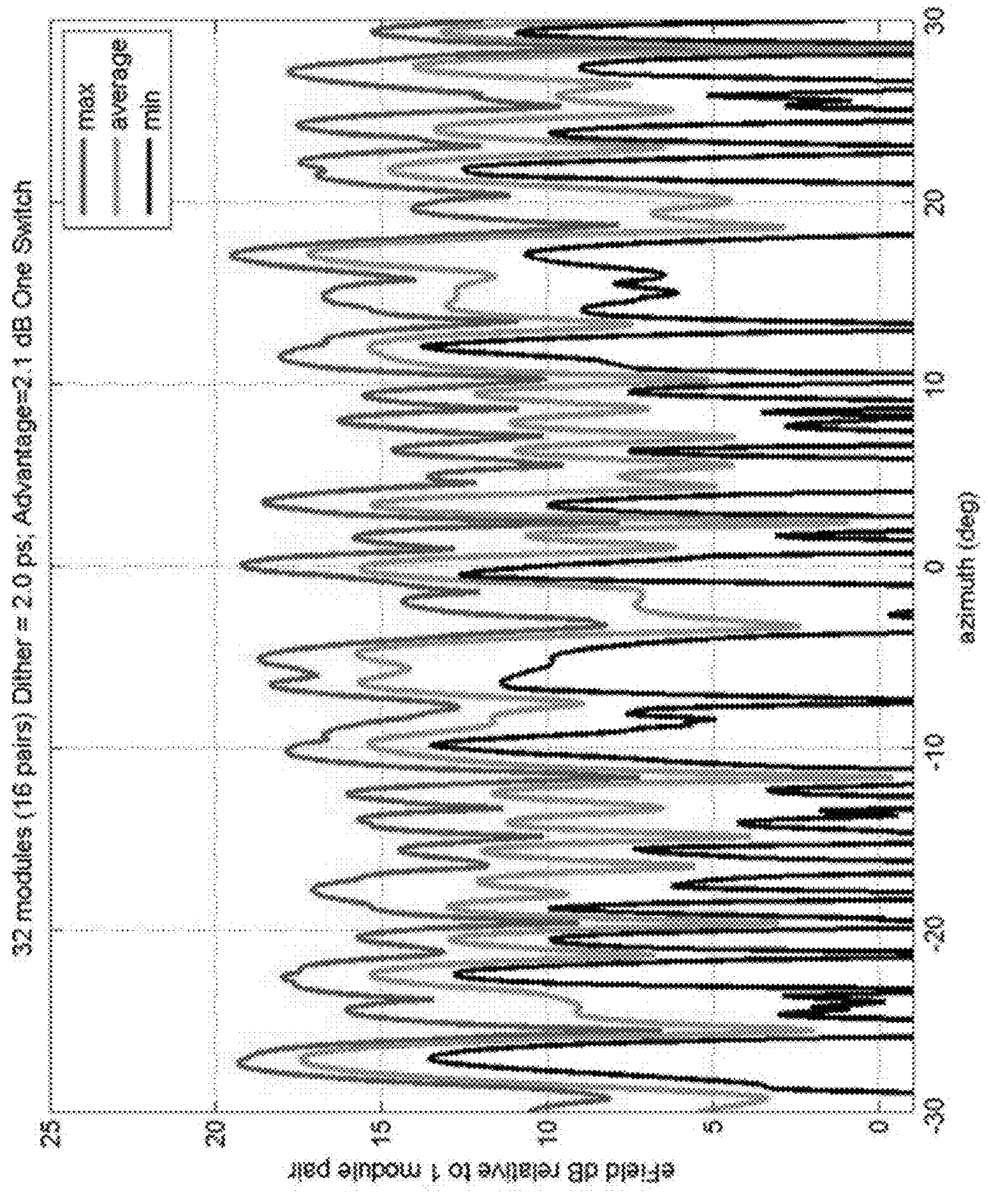
FIG. 4 is a graph depicting simulated results of 32 processing devices operating in close proximity with one another where a dither of 2.0 ps is employed to steer the peak emission of the processing devices into a time varying direction in accordance with at least some embodiments of the present disclosure.

With reference now to FIGS. 4-7, additional features and operational behaviors of the emitting instructions 316 will be discussed in accordance with at least some embodiments of the present disclosure. FIG. 4 depicts a first example where a simulation was performed for 32 processing devices operating in close proximity with one another. The simulation of FIG. 4 shows a scenario where a dither of 2.0 ps is employed to steer the peak emissions of the processing devices 104 in accordance with at least some embodiments of the present disclosure. As can be seen in this simulation, when each of the 32 processing devices 104 employ emitting instructions 316 that cause a time-varying phase delay of 2.0 ps, then an advantage of 2.1 dB per one switch is achieved.

Figure 5:
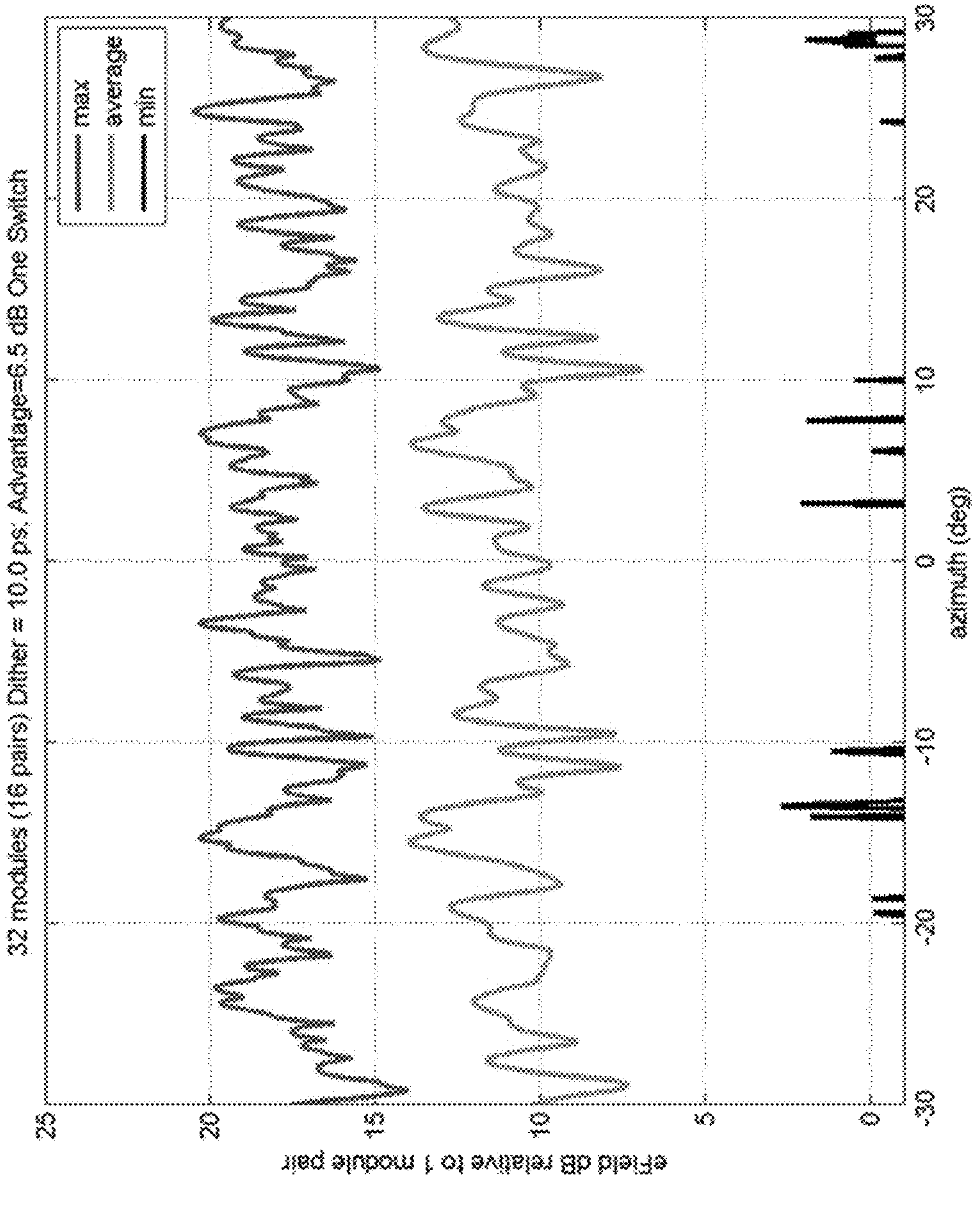
FIG. 5 is a graph depicting simulated results of 32 processing devices operating in close proximity with one another where a dither of 10.0 ps is employed to steer the peak emission of the processing devices into a time varying direction in accordance with at least some embodiments of the present disclosure.
Figure 6:
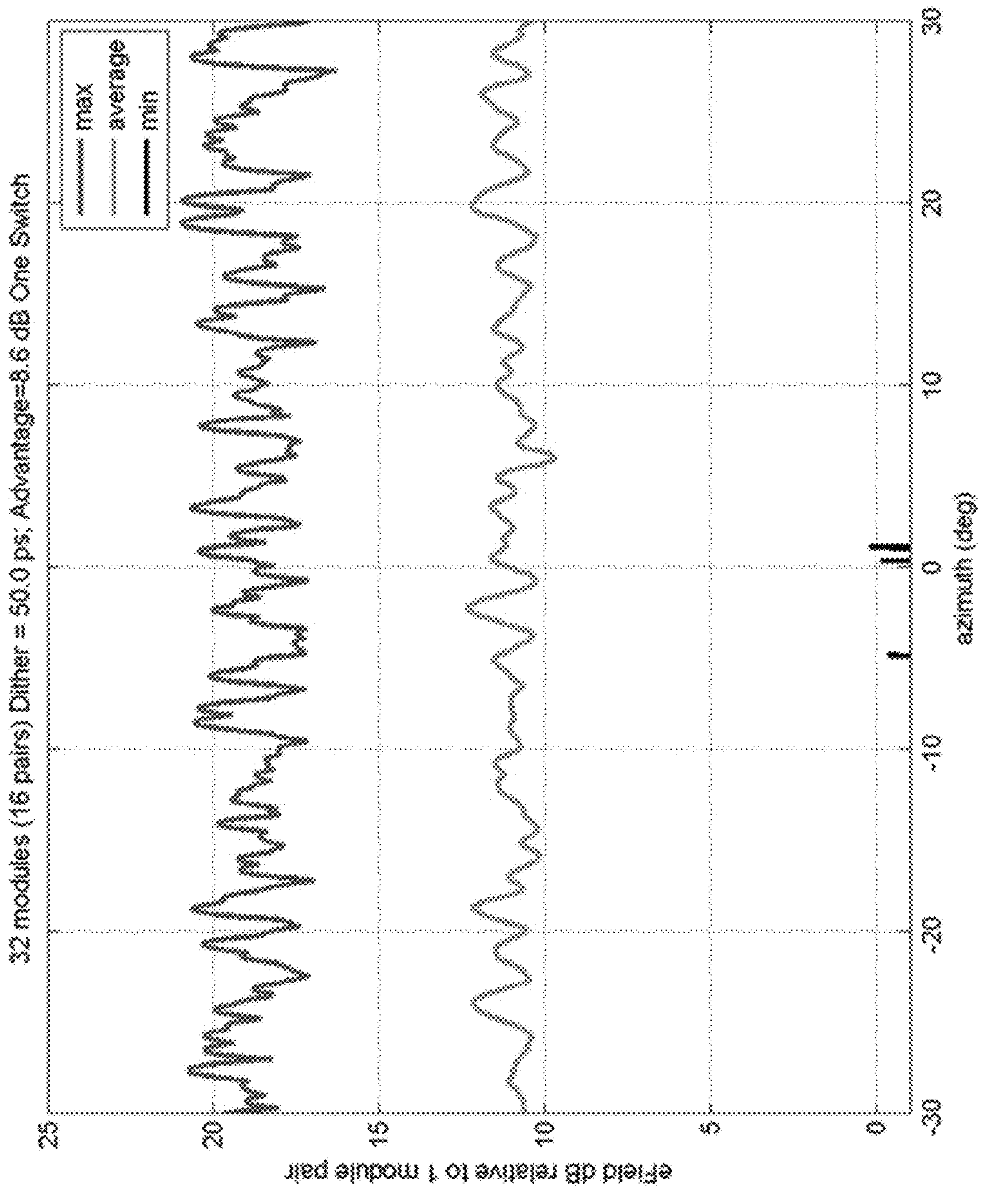
FIG. 6 is a graph depicting simulated results of 32 processing devices operating in close proximity with one another where a dither of 50.0 ps is employed to steer the peak emission of the processing devices into a time varying direction in accordance with at least some embodiments of the present disclosure.
Figure 7:
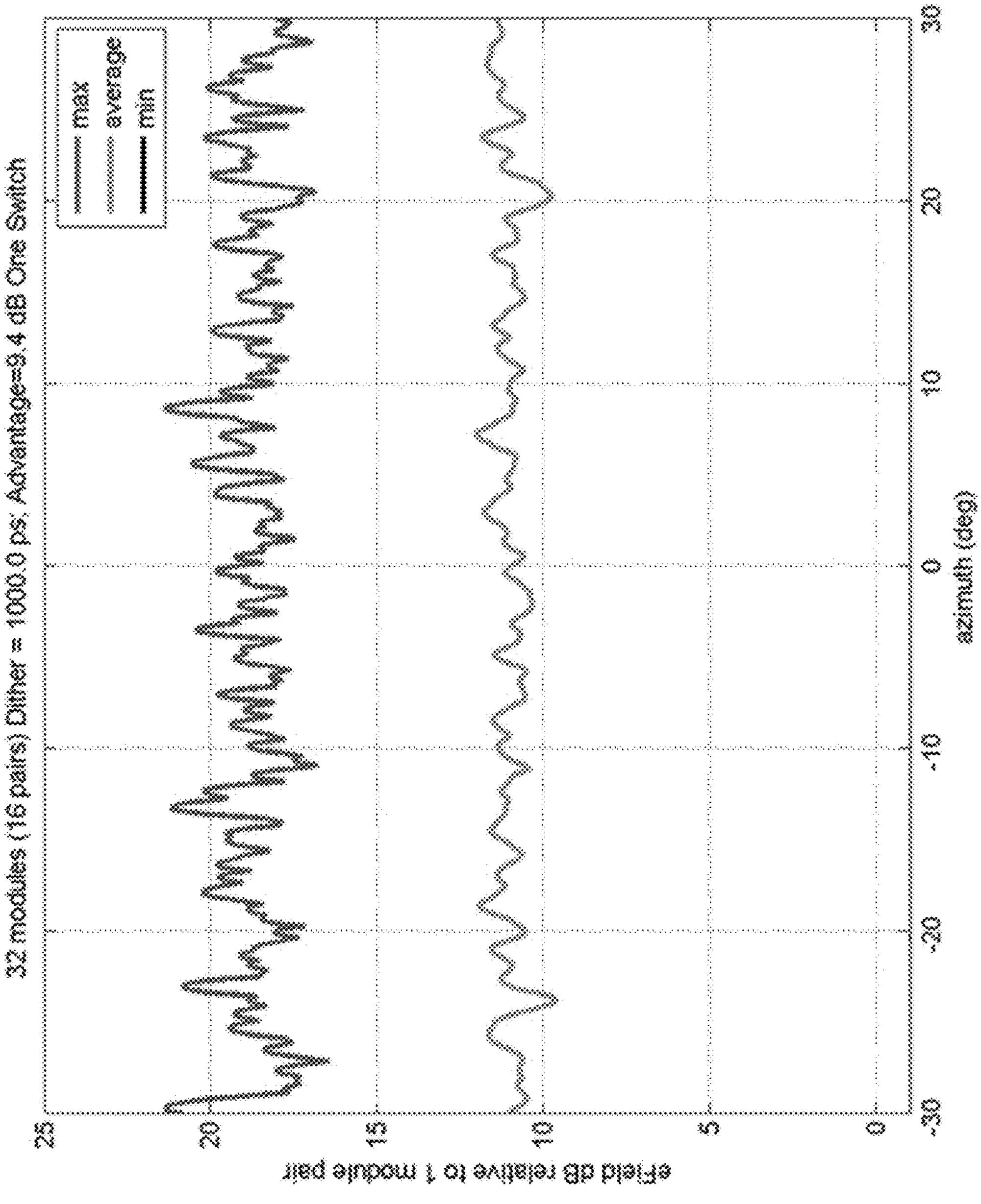
FIG. 7 is a graph depicting simulated results of 32 processing devices operating in close proximity with one another where a dither of 1000.0 ps is employed to steer the peak emission of the processing devices into a time varying direction in accordance with at least some embodiments of the present disclosure.

As can be seen in the simulation of FIG. 5, if the dither is increased from 2.0 ps to 10.0 ps, then the advantage can be increased to approximately 6.5 dB per switch. Further increasing the dither from 10.0 ps to 50.0 ps is shown to further increase the advantage to 8.6 dB per switch as shown in FIG. 6. Lastly, as shown in FIG. 7, if the dither is increased to 100.0 ps, then an advantage of approximately 9.4 dB can be achieved. These simulation results were performed for a situation where the processing devices 104*a*-N were not coordinated, but rather implemented independently on a time-varying basis.

Figure 8:
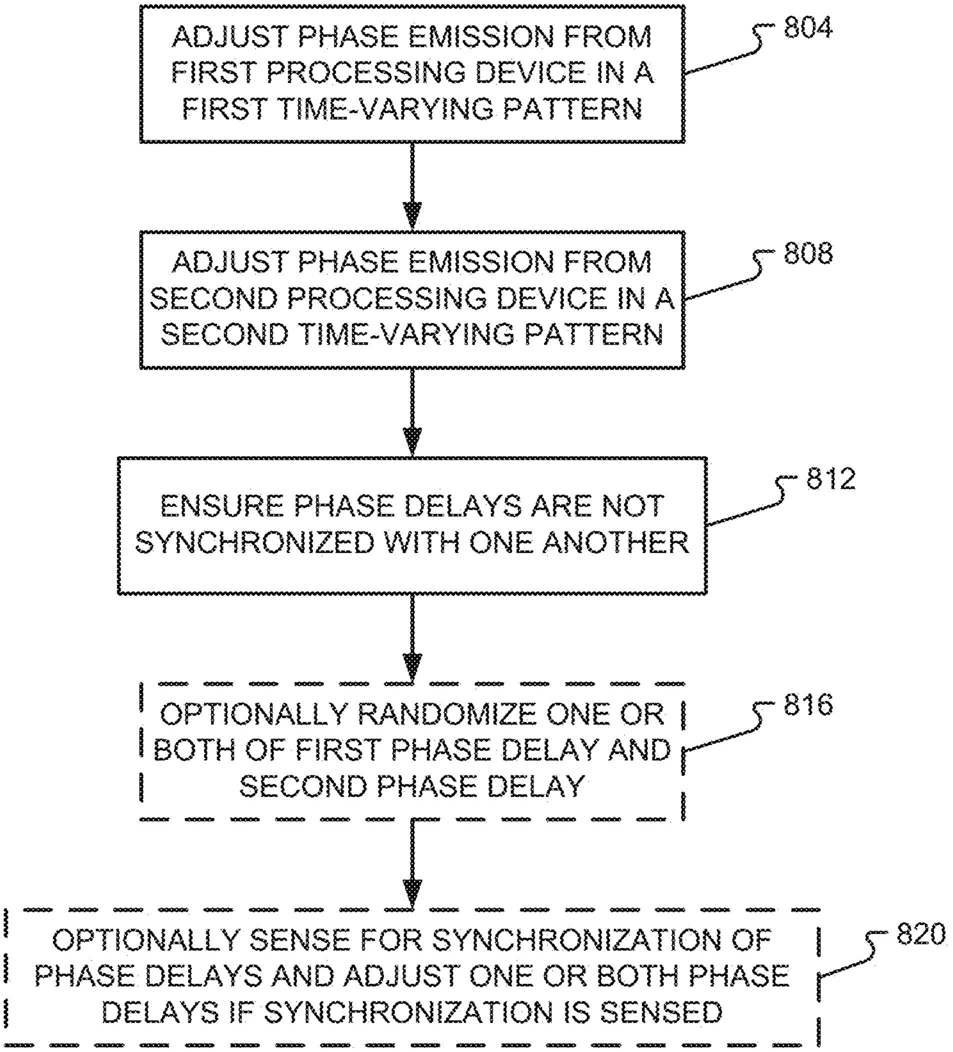
FIG. 8 is a flow diagram depicting a method of managing electromagnetic radiation by an array of processing devices into a common area in accordance with at least some embodiments of the present disclosure.

With reference now to FIG. 8, a method of managing electromagnetic radiation by an array of processing devices into a common area will be described in accordance with at least some embodiments of the present disclosure. Although the method will be described in connection with operating two processing devices near a common area 108, it should be appreciated that the concepts disclosed herein can be applied to the operation of N processing devices.

The method begins with a first processing device 104*a* begins operating and, as a result of its operation, emits electromagnetic radiation. The first processing device 104*a* utilizes its emitting instructions 316 to adjust the phase of its electromagnetic radiation 112*a* in a first time-varying pattern (step 804).

The method proceeds with a second processing device 104*b* operating and, as a result of its operation, emitting electromagnetic radiation into the same area as the first processing device 104*a*. The second processing device 104*b* adjusts the phase of its electromagnetic radiation 112*b* in a second time-varying pattern (step 808). In some embodiments, the phase delays of the first and second processing devices 104*a*, 104*b* may be controlled so as to ensure that they are not synchronized with one another (step 812). This may be accomplished by a number of mechanisms. As one example, an optional random number generator 324 can be utilized to randomize one or both of the first and second phase delay (step 816). Alternatively or additionally, a coordinator or coordination algorithm can be used to sense for synchronization of the phase delays and if such synchronization is detected, then one or both of the phase delays may be adjusted to avoid further synchronization (step 820).

In some embodiments, the first and/or second time-varying phase delay may be between 10 Hz and 100 Hz. In some embodiments, the first and/or second time-varying phase delay may be less than 1.0 kHz. In some embodiments, the first time-varying phase delay can be the same as the second time-varying phase delay but the first time-varying phase delay may be offset in time relative to the second time-varying phase delay. In some embodiments, the first time-varying phase delay is different from the second time-varying phase delay and the two delays may be offset in time relative to one another.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system, comprising:

a first processing device that emits electromagnetic radiation as part of its operation, the first processing device implementing a first time-varying phase delay;

a second processing device that emits electromagnetic radiation as part of its operation, wherein the electromagnetic radiation emitted by the second processing device is emitted to an area that also receives the electromagnetic radiation from the first processing device, the second processing device implementing a second time-varying phase delay; and emitting instructions that, when executed, ensure that the first time-varying phase delay is not synchronized with the second time-varying phase delay.

2. The system of claim 1, wherein the first time-varying phase delay and second time-varying phase delay reduce average emission of electromagnetic radiation in the area by the first and second processing devices.

3. The system of claim 2, wherein the first time-varying phase delay is different from the second time-varying phase delay.

4. The system of claim 2, wherein the first time-varying phase delay is the same as the second time-varying phase delay but is offset in time relative to the second time-varying phase delay.

5. The system of claim 1, wherein the first time-varying phase delay is at least partially driven by a random number generator in the first processing device.

6. The system of claim 1, wherein a frequency of the first time-varying phase delay is between 10 Hz and 100 Hz.

7. The system of claim 1, wherein a frequency of the first time-varying phase delay is less than 1.0 kHz.

8. The system of claim 1, wherein the first processing device corresponds to a first digital data transceiver module and wherein the second processing device corresponds to a second digital data transceiver module that are mounted in a common transceiver rack.

9. The system of claim 1, further comprising:

a random number generator that randomizes at least one of the first time-varying phase delay and the second time-varying phase delay.

10. The system of claim 1, wherein the first processing device is unaware of the second time-varying phase delay.

11. A method of managing electromagnetic radiation by a first processing device and a second processing device into a common area, the method comprising:

steering a peak emission of electromagnetic radiation in a time-varying direction by enforcing a first time-varying phase delay for the first processing device and by enforcing a second time-varying phase delay for the second processing device; and ensuring that the first time-varying phase delay is not synchronized with the second time-varying phase delay.

12. The method of claim 11, further comprising:

randomizing both the first time-varying phase delay and the second time-varying phase delay.

13. The method of claim 11, further comprising:

randomizing at least one of the first time-varying phase delay and the second time-varying phase delay.

14. The method of claim 11, wherein the first time-varying phase delay is different from the second time-varying phase delay so as to control an average emission of electromagnetic radiation in the common area by the first and second processing devices.

15. The method of claim 11, wherein the first time-varying phase delay is different from the second time-varying phase delay.

16. The method of claim 11, further comprising:

timing the first time-varying phase delay relative to the second time-varying phase delay so as to avoid matching the second time-varying phase delay.

17. An array of transceivers, comprising:

a first transceiver that emits electromagnetic radiation, wherein a processor of the first transceiver implements a first time-varying phase delay;

a second transceiver that emits electromagnetic radiation, wherein a processor of the second transceiver implements a second time-varying phase delay; and emitting instructions that ensure that the first time-varying phase delay is not synchronized with the second time-varying phase delay.

18. The array of claim 17, further comprising:

a third transceiver that emits electromagnetic radiation, wherein a processor of the third transceiver implements a third time-varying phase delay to steer a peak of the third transceiver's emitted electromagnetic radiation in a third time-varying direction that is different from both the first time-varying phase delay and the second time-varying phase delay.

19. The array of claim 18, wherein the first time-varying phase delay is the same as the second time-varying phase delay but is offset in time relative to the second time-varying phase delay.

20. The array of claim 17, further comprising:

a random number generator that randomizes at least one of the first time-varying phase delay and the second time-varying phase delay.

* * * * *